(12) United States Patent
Mayor et al.

(10) Patent No.: US 9,535,152 B2
(45) Date of Patent: Jan. 3, 2017

(54) RECEIVE ONLY MODE FOR CLOCK DRIFT CORRECTION

(71) Applicant: Apple Inc., Cupertino, CA (US)

(72) Inventors: Robert Mayor, Half Moon Bay, CA (US); Matthew Scott Klahn, San Francisco, CA (US); Longda Xing, San Jose, CA (US); Jinghua Ling, Palo Alto, CA (US); Jason Shi, Pleasanton, CA (US); Arun G. Mathias, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 758 days.

(21) Appl. No.: 13/788,185

(22) Filed: Mar. 7, 2013

(65) Prior Publication Data

US 2013/0328724 A1 Dec. 12, 2013

Related U.S. Application Data

(60) Provisional application No. 61/657,332, filed on Jun. 8, 2012.

(51) Int. Cl.
| | |
|---|---|
| G01S 3/02 | (2006.01) |
| G01S 5/02 | (2010.01) |
| G01S 19/05 | (2010.01) |
| G01S 19/23 | (2010.01) |

(52) U.S. Cl.
CPC ............... *G01S 5/02* (2013.01); *G01S 19/05* (2013.01); *G01S 19/23* (2013.01)

(58) Field of Classification Search
CPC ........... G01S 5/02; G01S 119/05; G01S 19/23

USPC .......................................................... 342/450
See application file for complete search history.

(56) References Cited

U.S. PATENT DOCUMENTS

| | | | | |
|---|---|---|---|---|
| 5,912,644 | A | * | 6/1999 | Wang ..................... G01S 5/14 |
| | | | | 342/457 |
| 6,178,513 | B1 | * | 1/2001 | Lee ......................... G06F 1/266 |
| | | | | 713/300 |
| 6,748,202 | B2 | | 6/2004 | Syrjärinne et al. |
| 7,877,104 | B2 | | 1/2011 | Turetzki et al. |
| 2008/0234935 | A1 | * | 9/2008 | Wolf ...................... G01C 21/16 |
| | | | | 701/472 |
| 2010/0238977 | A1 | * | 9/2010 | Bulled .............. H04W 52/0229 |
| | | | | 375/136 |
| 2010/0273504 | A1 | | 10/2010 | Bull et al. |

(Continued)

*Primary Examiner* — Frank J McGue
(74) *Attorney, Agent, or Firm* — Fish & Richardson P.C.

(57) ABSTRACT

In some implementations, radio access technology (RAT) signals can be monitored and used to synchronize an internal clock of a mobile device to a network system clock without registering the mobile device to the network. In some implementations, a RAT processor can be configured to receive RAT signals and to prevent transmission of RAT signals. In some implementations, the internal clock can be associated with a GNSS processor and can be used to calculate a location of the mobile device. In some implementations, a RAT processor that is configured for a particular radio access technology can be configured to monitor signals associated with another radio access technology when synchronizing the internal clock. In some implementations, the RAT processor can monitor signals in response to a power event. The power event can be associated with powering a display of the mobile device.

30 Claims, 4 Drawing Sheets

(56) References Cited

U.S. PATENT DOCUMENTS

2011/0054780 A1* 3/2011 Dhanani ................ G01C 21/26
                                                                 701/465
2011/0102251 A1    5/2011  Morrison
2011/0312320 A1   12/2011  Moeglein
2012/0083278 A1    4/2012  Kazmi et al.

* cited by examiner

RECEIVE ONLY MODE FOR CLOCK DRIFT CORRECTION

CROSS REFERENCE TO RELATED APPLICATIONS

This application is a non-provisional of and claims priority to U.S. Provisional Patent Application No. 61/657,332, filed on Jun. 8, 2012, the entire contents of which are hereby incorporated by reference.

TECHNICAL FIELD

The disclosure generally relates to network-assisted global navigation satellite system (GNSS) location technologies.

BACKGROUND

Radio access technologies (e.g., GSM, UMTS, CDMA, LTE) often require that a mobile device's (e.g., mobile computer, smartphone, tablet computer, etc.) internal clock is in synch with a network provider's system clock. However, internal clocks at the mobile device are often subject to clock drift due to changes in temperature, vibration, or other environmental conditions. To correct for clock drift, wireless signals received from the network provider can include clock synchronization data that the radio access technology processor at the mobile device can use to correct the mobile device's internal clock to more closely match the network's system clock.

Global navigation satellite system technologies (e.g., GPS, GLONASS, Galileo, Beidou systems, etc.) also require that the internal clock at the mobile device is synchronized with the GNSS system clock. A small difference between the GNSS system clock and a mobile device's internal clock can result in large errors in location calculations. Because acquisition of GNSS satellites and synchronization of GNSS clocks based on GNSS signals can take a long time, often GNSS systems can take a long time to provide an accurate location for the mobile device.

The startup time of a GNSS system can be reduced and accuracy improved by assisting the GNSS system with data from the network. For example, a radio access technology processor of the mobile device can quickly acquire network radio signals and obtain clock synchronization information from the network signals. The clock synchronization information can be used to correct the clock drift associated with the GNSS processor clock within the mobile device. However, if the radio access technology processor is turned off, the GNSS system can no longer receive the benefit of network-based clock synchronization.

SUMMARY

In some implementations, radio access technology (RAT) signals can be monitored and used to synchronize an internal clock of a mobile device to a network system clock without registering the mobile device to the network. In some implementations, a RAT processor can be configured to receive RAT signals and to prevent transmission of RAT signals. In some implementations, the internal clock can be associated with a GNSS processor and can be used by the GNSS processor to calculate a location of the mobile device. In some implementations, a RAT processor that is configured for a particular radio access technology can be configured to monitor signals associated with another radio access technology when synchronizing the internal clock. In some implementations, the RAT processor can monitor signals in response to a power event. The power event can be associated with powering a display of the mobile device.

Particular implementations provide at least the following advantages: The mobile device can avoid using network resources associated with registering with the network by monitoring RAT signals without transmitting signals or registering with the network. The mobile device can reduce the amount of time required to get an initial GNSS location fix by synchronizing the internal GNSS clock with the network system clock. Mobile device power consumption can be reduced by monitoring RAT signals (e.g., powering the RAT processor) when other system components are powered.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Overview

Mobile devices can include radio access technology (e.g., cellular voice and data) components and GNSS components. Often, the radio access technology (RAT) components can assist or augment the functionality of the GNSS components. For example, RAT signals can include timing (e.g, network system clock, network timing reference) information that allows the mobile device to correct clock drift associated with an internal GNSS clock. Since the GNSS internal clock is used to calculate a position of the mobile device, clock correction is often necessary to provide an accurate location calculation. The network timing assistance received in the RAT signals can improve the GNSS time to fix at initial startup, for example. Additionally, RAT signals can include a frequency reference that can be used by the GNSS component to improve GNSS satellite acquisition and tracking.

Moreover, RAT signals can include cell identification information that can be used to estimate the location of the mobile device. For example, some networks can transmit location data over the air. Alternatively, the RAT component can receive network signals that identify a serving cell or combination of serving cell and neighbor cells. The cell identification information can be used to determine a location estimate for the mobile device based on the locations of the network cells (e.g., transmitters). The network cell based location estimate can be provided to the GNSS component to assist the GNSS component in determining the location of the mobile device.

However, RAT components consume network resources. For example, even if a user of the mobile device does not subscribe to a network provider's services, RAT components will communicate (e.g., register) with the network while determining whether the mobile device can access the network. This communication and interaction (e.g., handshaking) with the network consumes network resources that should be used to service paying customers. However, if the RAT component is turned off, the RAT clock correction information will not be available and GNSS calculations can quickly become inaccurate due to uncorrected clock drift.

Moreover, in implementations where the RAT component and the GNSS component share a clock, the clock can be calibrated over time when operating under normal conditions (e.g., turned on) and within a normal temperature range. For example, calibration data is a measurement of clock behavior over temperature. The calibration data provides clock error correction data according to the temperature of the clock. When the RAT component is turned off (e.g., low power mode) for long periods of time and the temperature of the RAT component and the clock change (e.g., cool), the calibration data can become old and no longer model the frequency of the clock well. Thus, a receive-only mode for RAT components is described that allows the GNSS component to benefit from network timing, frequency and location information while maintaining proper temperature of the RAT/GNSS components and preventing the consumption of network resources.

Network Assisted GNSS Location

Figure 1:
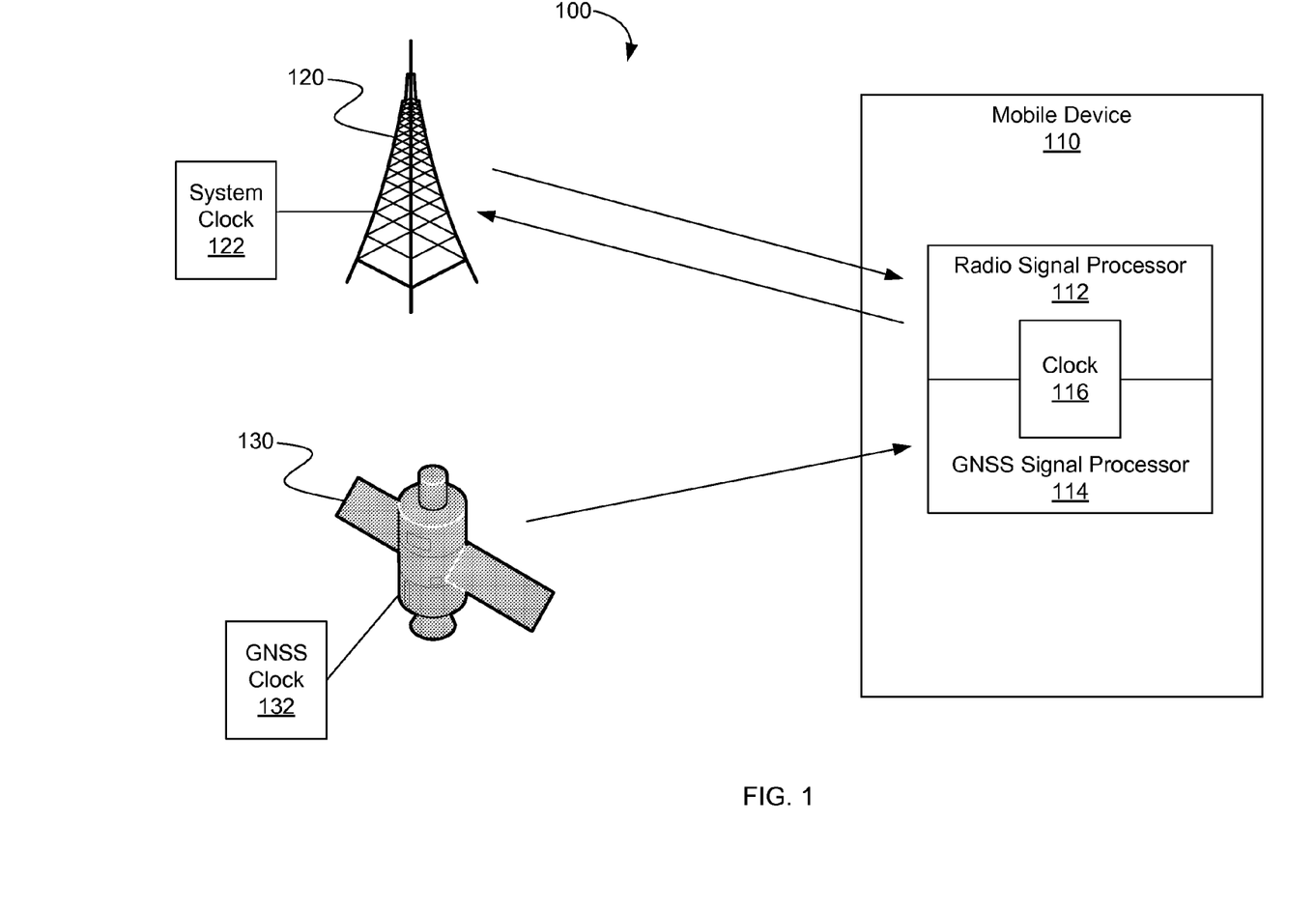
FIG. 1 illustrates an example system for providing network-assisted GNSS location.

FIG. 1 illustrates an example system 100 for providing network-assisted GNSS location. In some implementations, system 100 can include a mobile device 110. Mobile device 110 can be a laptop computer, smartphone, feature phone, tablet computer or any other computing device. In some implementations, mobile device 110 can be configured to communicate with one or more networks using radio signal processor 112. For example, radio signal processor 112 can be a RAT component that is configured to receive, transmit and/or process radio access technology signals. Radio signal processor 112 can be a baseband processor, for example. RAT signals that can be processed by radio signal processor 112 can include, for example, GSM (Global System for Mobile Communications) signals, UMTS (GSM-based Universal Mobile Telecommunications System) signals, CDMA (code division multiple access) signals, LTE (Long Term Evolution) signals and/or any signals based on or derived from these technologies. For example, UMTS and LTE are based on GSM. LTE is also based on CDMA.

In some implementations, mobile device 110 can include GNSS (global navigation satellite system) processor 114. GNSS processor can process signals received from satellite systems (e.g., GPS, GLONASS, Galileo, Beidou systems, etc.) and determine a geographic location of mobile device 100 based on the received signals.

In some implementations, radio signal processor 112 and GNSS signal processor 114 can share an internal clock 116. For example, if radio signal processor 112 and GNSS signal processor 114 are manufactured on the same chip, a single internal clock can be shared by radio signal processor 112 and GNSS signal processor 114. In some implementations, radio signal processor 112 and GNSS signal processor 114 each have their own internal clock. For example, if radio signal processor 112 and GNSS signal processor 114 are manufactured separately (e.g., separate components, separate chips), then they each can have a dedicated internal clock.

In some implementations, system 100 can include RAT base station 120. RAT base station 120 can be configured to transmit and receive RAT signals to and from mobile device 110 and provide access to network resources (e.g., Internet). Radio signal processor 112 on mobile device 110 can process the RAT signals received from base station 120 and transmit RAT signals to base station 120. For example, base station 120 can broadcast RAT signals that include timing, frequency and/or location information that can be used to assist GNSS location estimates. For example, network timing information (e.g., network timing reference) can be used by the radio signal processor 112 to synchronize internal clock 116 with RAT system clock 122. For example, internal clock 116 can be subject to clock drift due to temperature and other environmental changes. The signals received from base station 120 allow radio signal processor 112 to adjust internal clock 116 to correct for the clock drift. The network frequency information (e.g., frequency reference) can be used to center acquisition and tracking channels of the GNSS component. Location information received from the network can be provided to the GNSS component to improve location estimates.

In some implementations, system 100 can include GNSS satellite 130. Satellite 130 can broadcast GNSS signals that can be received by GNSS signal processor 114. For example, the GNSS signals can include GNSS clock information associated with GNSS clock 132. The GNSS clock information can be used by GNSS signal processor 114 to calculate the location of mobile device 110. However, accurate calculation of the location of mobile device 110 depends on internal clock 116 being synchronous with GNSS clock 132. For example, because the location calculation is based on the location of satellite 130 and the time it takes for the signal to travel from satellite 130 to mobile device 110 (as calculated by comparing the time at which the signal was transmitted to the time at which the signal is received), a small difference in time between internal clock 116 (associated with the receive time) and GNSS clock 132 (associated with the transmit time) can cause an inaccurate location calculation. Thus, in some implementations, GNSS location calculations can be improved by synchronizing internal clock 116 with RAT system clock 122. For example, RAT system clock 122 and GNSS clock 132 can be synchronized.

In some implementations, radio signal processor 112 can be turned off. For example, if the user of mobile device 110 does not subscribe to a RAT-based service (e.g., voice and/or data service provided by a network provider), then radio signal processor 112 can be turned off (e.g., placed in a low power mode). Turning off radio signal processor 112 can prevent radio signal processor 112 from receiving or transmitting RAT signals. Turning off radio signal processor 112 can also reduce the amount of power consumed by radio signal processor 112 thereby extending battery life of mobile device 110. The network provider can also gain a benefit from turning off radio signal processor 112 because network resources are not being consumed processing RAT signals received from radio signal processor 112. However, when radio signal processor 112 is turned off, GNSS signal processor 114 no longer gains the benefit of clock drift correction and GNSS location calculations can lose accuracy. Thus, a 'receive-only mode' can be implemented to provide clock drift correction and improve the accuracy of GNSS location calculations.

Receive Only Mode

Figure 2:
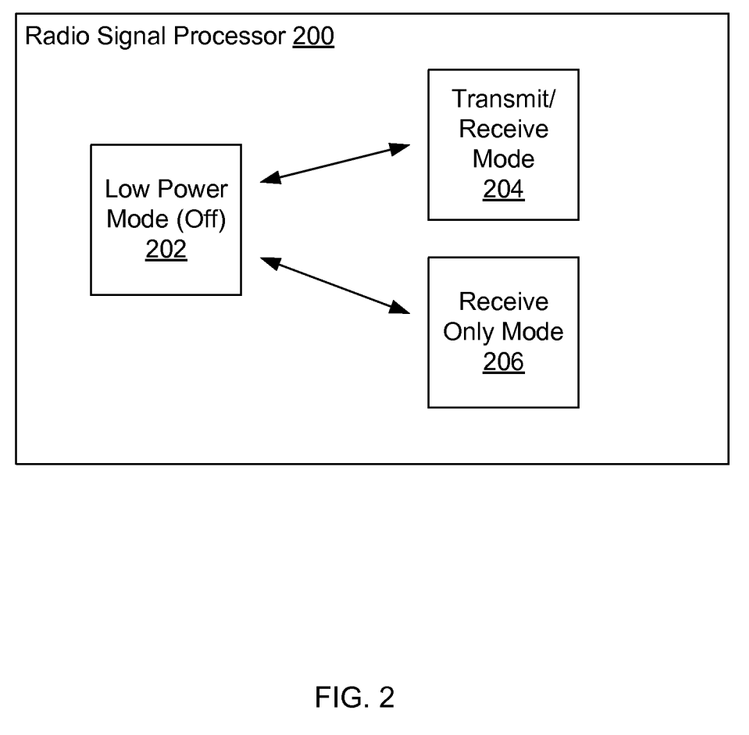
FIG. 2 illustrates an example radio access technology signal processor.

FIG. 2 illustrates an example radio signal processor 200. For example, radio signal processor 200 can be a RAT signal processor 112 (e.g., baseband processor) of mobile device 110. In some implementations, radio signal processor 200 can include low power mode 202. For example, low power mode 202 can be a mode of radio signal processor 200 where radio signal processor 200 does not receive and transmit signals. Radio signal processor 200 can enter low power mode 202, when mobile device 110 is in a low power or standby mode, for example. In some implementations, low power mode 202 can be the default mode for the mobile device. For example, the device can operate in low power mode when the user has not subscribed to a network service provider.

In some implementations, radio signal processor 200 can include a transmit/receive mode 204. For example, radio signal processor 200 can enter transmit/receive mode 204 when radio signal processor 200 is configured to communicate voice and/or data information to a network provider's network. Transmit/receive mode 204 can be entered, for example, when a user of a mobile device has subscribed to a network provider and when the user desires to access the network provider's network. In some implementations, transmit/receive mode 204 can be entered even when the user has not subscribed to a network provider. For example, the radio signal processor can be turned on and transmit/receive mode 204 enabled even though the user has not subscribed to a network provider's services. However, the transmit/receive mode allows non-subscribers to consume network resources that should be reserved for users who subscribe to the network provider's services.

In some implementations, radio signal processor 200 can include receive only mode 206. For example, radio signal processor 200 can enter receive only mode 206 when a radio setting of mobile device 110 indicates that the radio signal processor 200 should be turned off and when GNSS location calculations may be performed. For example, if the user of mobile device 110 is not a subscriber to a network provider, then radio signal processor 200 can be turned off so that the radio signal processor does not cause network resources to be consumed by transmitting signals to the network. The user can manipulate a radio signal processor setting (e.g., system setting) of the mobile device to turn radio signal processor 200 off, for example.

In some implementations, receive only mode 206 can be entered in anticipation of the user requiring location services (e.g., GNSS location) so that an accurate location can be determined. For example, location services may be required by the user when the mobile device is initially turned on, when the mobile device's display is illuminated or when the user invokes an application that provides location-based services. Thus, if the device is being operated by the user (e.g, powered on, not in a standby, sleep mode, or low power mode) but radio signal processor 200 is turned off, radio signal processor 200 can enter receive only mode 206 so that RAT signals can be received, network time reference, frequency reference and location information can be obtained, and the speed and accuracy of GNSS location calculations can be improved. Moreover, by periodically turning on the RAT signal processor in receive only mode the RAT signal processor can be maintained at a normal operating temperature range thereby allowing the integrity of the clock calibration data to be retained. The calibration data will then be useful to correct clock error and estimate a proper frequency range when no network is available. For example, if the temperature of the RAT signal processor or clock is outside the range of temperatures included in the calibration data, the calibration data will not be useful to correct clock error.

Example Process

Figure 3:
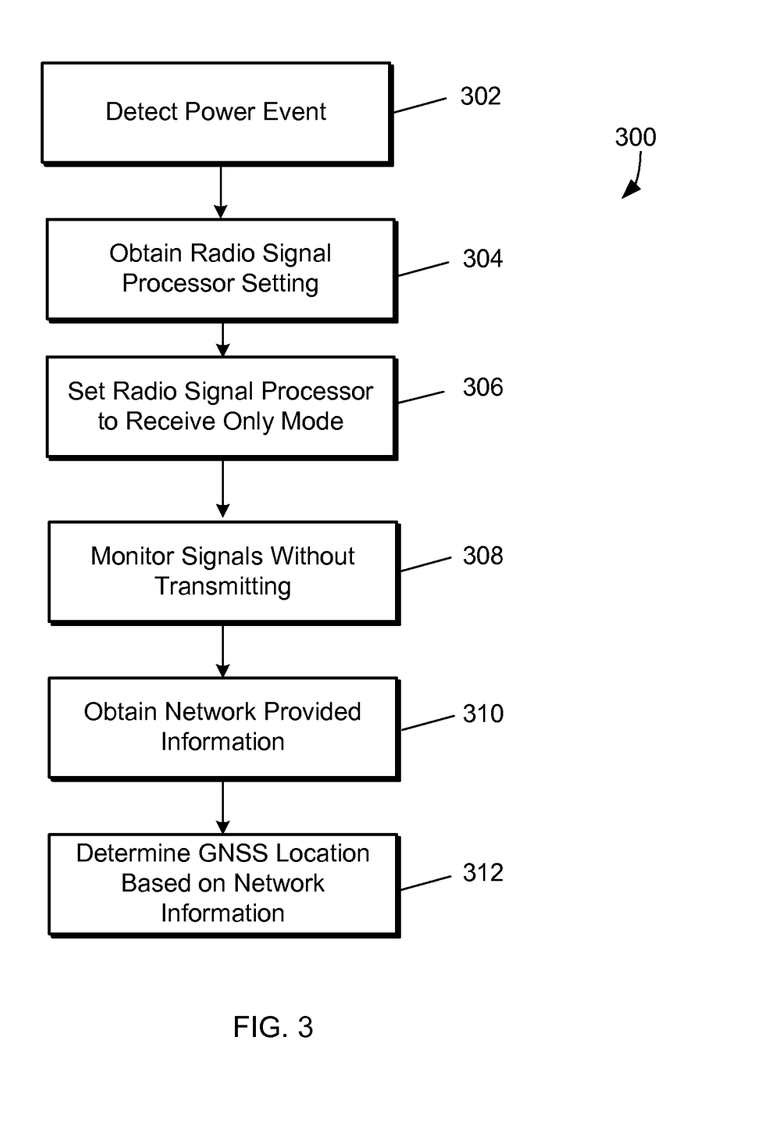
FIG. 3 is flow diagram of an example receive only mode process.

FIG. 3 is flow diagram 300 of an example receive only mode process. While flow diagram 300 depicts steps performed in a specific sequence, the steps can be performed in any order and the process does not require the steps to be performed in a specific sequence.

At step 302, a power event can be detected. For example, prior to the detected power event, the mobile device can be in a low power state (e.g., sleep mode). While the mobile device is in the low power state, the radio signal processor can also be in a low power mode where the radio signal processor is not receiving and/or transmitting signals. When a power event is detected, the radio signal processor can enter a receive/transmit mode or a receive-only mode. For example, the power event can correspond to illuminating or powering the display screen of the mobile device or powering another component of the mobile device.

At step 304, a radio signal processor setting can be obtained. For example, the radio signal processor setting can be obtained from the operating system settings of a mobile device. The radio signal processor setting can indicate that the radio signal processor should be turned on or off. A user of the mobile device can turn the radio signal processor off, for example, if the user does not subscribe to wireless data and/or voice services of a network service provider. In some implementations, the radio signal processor can be automatically turned off by the mobile device. For example, the radio signal processor can be automatically turned off if the mobile device is not authorized to access a RAT network. The radio signal processor can be automatically turned off when the mobile device connects to a WiFi network. For example, on a data only mobile device (e.g., a device not configured for wireless voice telephony), when the mobile device is connected to a WiFi network, there is no need for the mobile device to consume RAT network resources. Thus, the radio signal processor can be automatically turned off when the mobile device is connected to a WiFi network.

At step 306, the radio signal processor can be set to a receive-only mode. For example, in response to detecting a power event at step 302 and based on the radio signal processor setting obtained at step 304 indicating that the radio signal processor should be turned off, the radio signal processor can be set to receive signals and prevent transmitting signals. For example, the receiver of the radio signal processor can be turned on and the transmitter of the radio signal processor can be turned off.

In some implementations, when a GSM-based (e.g., GSM, UMTS, LTE, etc.) mobile device does not have a SIM (subscriber identity module) card installed, the mobile device can be configured to monitor (e.g., receive only) GSM-based signals so that emergency calls can be made from the mobile device. In some implementations, the receive-only mode described herein can be implemented by ignoring an installed SIM card on a GSM mobile device to cause the device to monitor GSM-based signals and correct clock drift using the clock timing information contained in the GSM-based signals.

At step 308, the radio signal processor can monitor (e.g., receive) RAT signals without transmitting RAT signals. In some implementations, the type of RAT signals received and processed in receive-only mode are different than the type of RAT signals received and transmitted in receive/transmit mode. For example, in receive/transmit mode, the radio signal processor can be configured to receive and transmit CDMA (or CDMA-based) signals. When in receive-only mode, the radio signal processor can be configured to receive GSM (or GSM-based) signals. This can be beneficial in environments where GSM is the prevalent technology but where the mobile device and the radio signal processor are provisioned to operate on a CDMA network. Similarly, for example, in receive/transmit mode, the radio signal processor can be configured to receive and transmit GSM (or GSM-based) signals. When in receive-only mode, the radio signal processor can be configured to receive CDMA (or CDMA-based) signals. This can be beneficial because CDMA provides a better clock synchronization that can result in more accurate GNSS location calculations.

At step 310, network timing, frequency and/or location information can be obtained from the RAT signals. For example, the internal clock can be adjusted based on network timing information in the received signals. For example, the radio signal processor can processes received RAT signals to obtain network system clock synchronization information according to well known techniques. The internal clock (e.g., radio signal processor clock, GNSS processor clock, shared clock, etc.) can then be adjusted based on the signal clock synchronization information to correct for clock drift. Frequency information can be used to acquire and track GNSS satellites, for example. Network location information can be used to provide an initial GNSS location estimate.

At step 312, the GNSS processor can determine the current location of the mobile device based on the network information. For, example, the GNSS processor can receive signals from GNSS satellites, compare the signals to the adjusted internal clock and calculate a current location of the mobile device based on the GNSS signals and the internal clock. The GNSS processor can use the network location information to quickly determine an initial location estimate. The GNSS processor can use the network frequency information to quickly acquire and track GNSS satellites.

Example System Architecture

Figure 4:
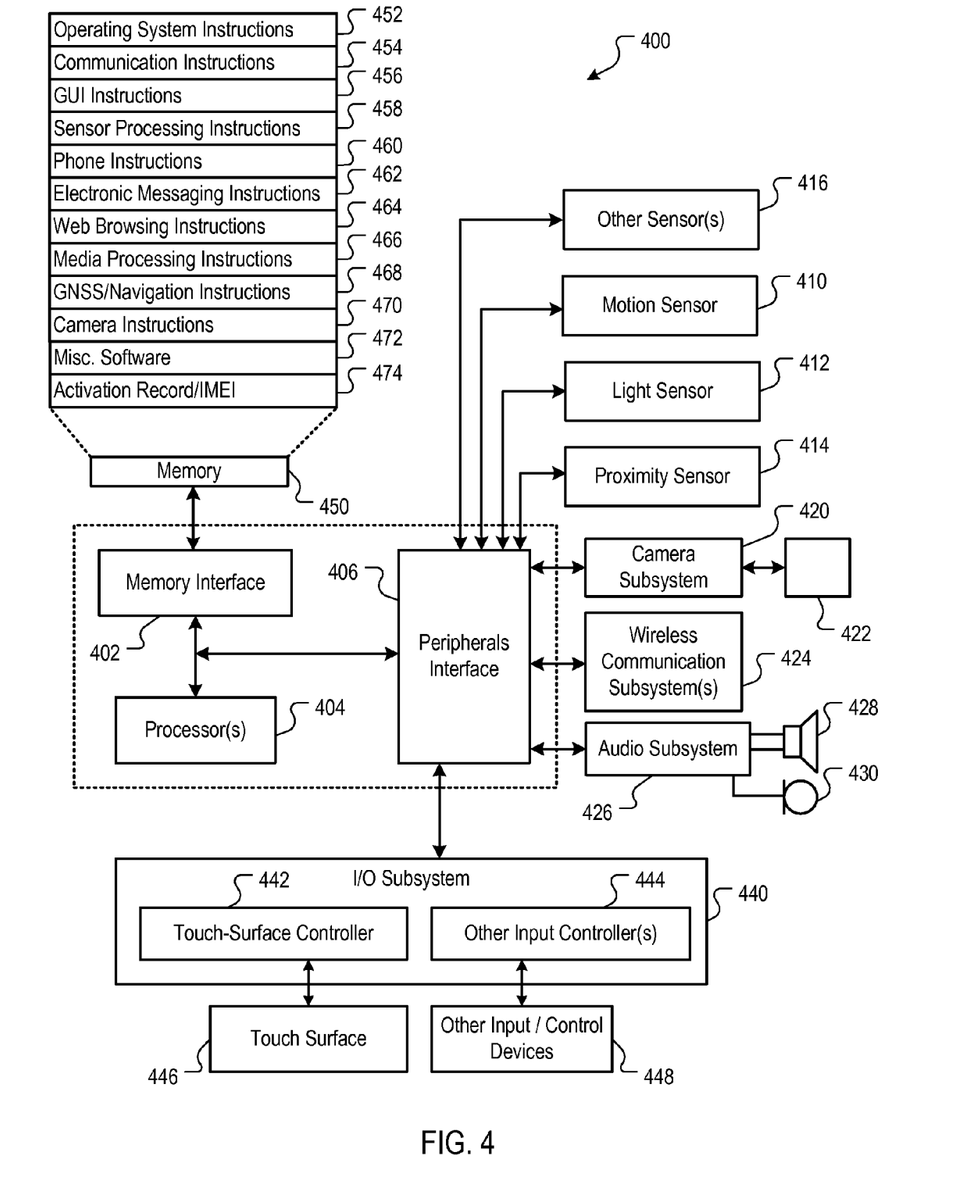
FIG. 4 is a block diagram of an exemplary system architecture implementing the features and processes of FIGS. 1-3.

FIG. 4 is a block diagram of an example computing device 400 that can implement the features and processes of FIGS. 1-3. The computing device 400 can include a memory interface 402, one or more data processors, image processors and/or central processing units 404, and a peripherals interface 406. The memory interface 402, the one or more processors 404 and/or the peripherals interface 406 can be separate components or can be integrated in one or more integrated circuits. The various components in the computing device 400 can be coupled by one or more communication buses or signal lines.

Sensors, devices, and subsystems can be coupled to the peripherals interface 406 to facilitate multiple functionalities. For example, a motion sensor 410, a light sensor 412, and a proximity sensor 414 can be coupled to the peripherals interface 406 to facilitate orientation, lighting, and proximity functions. Other sensors 416 can also be connected to the peripherals interface 406, such as a global navigation satellite system (GNSS) (e.g., GPS receiver), a temperature sensor, a biometric sensor, or other sensing device, to facilitate related functionalities. For example, the GNSS receiver can include an internal clock that can be adjusted to compensate for clock drift based on clock synchronization signals received at the wireless communication subsystem 424, described below.

A camera subsystem 420 and an optical sensor 422, e.g., a charged coupled device (CCD) or a complementary metal-oxide semiconductor (CMOS) optical sensor, can be utilized to facilitate camera functions, such as recording photographs and video clips. The camera subsystem 420 and the optical sensor 422 can be used to collect images of a user to be used during authentication of a user, e.g., by performing facial recognition analysis.

Communication functions can be facilitated through one or more wireless communication subsystems 424, which can include radio frequency receivers and transmitters and/or optical (e.g., infrared) receivers and transmitters. The specific design and implementation of the communication subsystem 424 can depend on the communication network(s) over which the computing device 400 is intended to operate. For example, the computing device 400 can include communication subsystems 424 designed to operate over a GSM network, a GPRS network, an EDGE network, a Wi-Fi or WiMax network, and a Bluetooth™ network. In particular, the wireless communication subsystems 424 can include hosting protocols such that the device 100 can be configured as a base station for other wireless devices. The wireless communication subsystems 424 can include a radio signal processor (e.g., a radio access technology baseband processor). The radio signal processor can be configured to operate in a receive-only mode, as described above with reference to FIGS. 1-3.

An audio subsystem 426 can be coupled to a speaker 428 and a microphone 430 to facilitate voice-enabled functions, such as speaker recognition, voice replication, digital recording, and telephony functions.

The I/O subsystem 440 can include a touch-surface controller 442 and/or other input controller(s) 444. The touch-surface controller 442 can be coupled to a touch surface 446. The touch surface 446 and touch-surface controller 442 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 446.

The other input controller(s) 444 can be coupled to other input/control devices 448, such as one or more buttons, rocker switches, thumb-wheel, infrared port, USB port, and/or a pointer device such as a stylus. The one or more buttons (not shown) can include an up/down button for volume control of the speaker 428 and/or the microphone 430.

In one implementation, a pressing of the button for a first duration can disengage a lock of the touch surface 446; and a pressing of the button for a second duration that is longer than the first duration can turn power to the computing device 400 on or off. Pressing the button for a third duration can activate a voice control, or voice command, module that enables the user to speak commands into the microphone 430 to cause the device to execute the spoken command. The user can customize a functionality of one or more of the buttons. The touch surface 446 can, for example, also be used to implement virtual or soft buttons and/or a keyboard.

In some implementations, the computing device 400 can present recorded audio and/or video files, such as MP3, AAC, and MPEG files. In some implementations, the computing device 400 can include the functionality of an MP3 player, such as an iPod™. The computing device 400 can, therefore, include a 36-pin connector that is compatible with the iPod. Other input/output and control devices can also be used.

The memory interface 402 can be coupled to memory 450. The memory 450 can include high-speed random access memory and/or non-volatile memory, such as one or more magnetic disk storage devices, one or more optical storage devices, and/or flash memory (e.g., NAND, NOR). The memory 450 can store an operating system 452, such as Darwin, RTXC, LINUX, UNIX, OS X, WINDOWS, or an embedded operating system such as VxWorks.

The operating system 452 can include instructions for handling basic system services and for performing hardware dependent tasks. In some implementations, the operating system 452 can be a kernel (e.g., UNIX kernel). In some implementations, the operating system 452 can include instructions for receiving input setting a current mode of a radio signal processor (e.g., baseband processor). For example, operating system 452 can implement features that allow a user to turn on or off the radio signal processor of the mobile device, as described with reference to FIGS. 1-3.

The memory 450 can also store communication instructions 454 to facilitate communicating with one or more additional devices, one or more computers and/or one or more servers. The memory 450 can include graphical user interface instructions 456 to facilitate graphic user interface processing; sensor processing instructions 458 to facilitate sensor-related processing and functions; phone instructions 460 to facilitate phone-related processes and functions; electronic messaging instructions 462 to facilitate electronic-messaging related processes and functions; web browsing instructions 464 to facilitate web browsing-related processes and functions; media processing instructions 466 to facilitate media processing-related processes and functions; GNSS/Navigation instructions 468 to facilitate GNSS and navigation-related processes and instructions; and/or camera instructions 470 to facilitate camera-related processes and functions. The memory 450 can store other software instructions 472 to facilitate other processes and functions of the mobile device.

For example, the memory 450 can also store other software instructions (not shown), such as web video instructions to facilitate web video-related processes and functions; and/or web shopping instructions to facilitate web shopping-related processes and functions. In some implementations, the media processing instructions 466 are divided into audio processing instructions and video processing instructions to facilitate audio processing-related processes and functions and video processing-related processes and functions, respectively. An activation record and International Mobile Equipment Identity (IMEI) 474 or similar hardware identifier can also be stored in memory 450.

Each of the above identified instructions and applications can correspond to a set of instructions for performing one or more functions described above. These instructions need not be implemented as separate software programs, procedures, or modules. The memory 450 can include additional instructions or fewer instructions. Furthermore, various functions of the computing device 400 can be implemented in hardware and/or in software, including in one or more signal processing and/or application specific integrated circuits.

What is claimed is:

1. A method comprising:
   determining whether conditions for receive-only mode for adjusting a clock of a mobile device are satisfied, wherein the conditions include a first condition that a radio access technology processor of the mobile device is turned off and a second condition that the mobile device is anticipating a request for location services;
   in response to determining that the conditions are satisfied, configuring the radio access technology processor to operate in the receive-only mode, wherein:
      in a transmit/receive mode, the radio access technology processor is programmed to transmit and receive radio signals, and
      in the receive-only mode, the radio access technology processor is programmed to receive radio signals and to disable transmission of radio signals;
   receiving time information by the radio access technology processor operating in the receive-only mode;
   adjusting the clock of the mobile device according to the time information;
   determining a location of the mobile device based on the adjusted clock using a navigation signal processor; and
   providing the location of the mobile device as an input to the location services.

2. The method of claim 1, wherein the radio access technology processor is configured to process CDMA signals.

3. The method of claim 1, wherein the radio access technology processor is configured to process GSM signals.

4. The method of claim 1, wherein the radio access technology processor is configured to process UMTS signals.

5. The method of claim 1, wherein the radio access technology processor is configured to process LTE signals.

6. The method of claim 1, wherein the radio access technology processor is configured to process signals associated with a first radio access technology and configuring the radio access technology processor comprises configuring the radio access technology processor to process signals associated with a second radio access technology.

7. The method of claim 6, wherein the first radio access technology is CDMA-based and the second radio access technology is GSM-based.

8. The method of claim 6, wherein the first radio access technology is GSM-based and the second radio access technology is CDMA-based.

9. The method of claim 6, wherein the first radio access technology is CDMA-based and the second radio access technology is LTE-based.

10. The method of claim 1, wherein determining whether the conditions for receive-only mode for adjusting the clock of the mobile device are satisfied comprises determining that the mobile device is being operated by a user.

11. A non-transitory computer-readable medium including one or more sequences of instructions which, when executed by one or more processors, causes:
   determining whether conditions for receive-only mode for adjusting a clock of a mobile device are satisfied, wherein the conditions include a first condition that a radio access technology processor of the mobile device is turned off and a second condition that the mobile device is anticipating a request for location services;
   in response to determining that the conditions are satisfied, configuring the radio access technology processor to operate in the receive-only mode, wherein,
      in a transmit/receive mode, the radio access technology processor is programmed to transmit and receive radio signals, and
      in the receive-only mode, the radio access technology processor is programmed to receive radio signals and to disable transmission of radio signals;
   receiving time information by the radio access technology processor operating in the receive-only mode;

adjusting the clock of the mobile device according to the time information; and determining a location of the mobile device based on the adjusted clock using a navigation signal processor; and providing the location of the mobile device as an input to the location services.

12. The non-transitory computer-readable medium of claim 11, wherein the radio access technology processor is configured to process CDMA signals.

13. The non-transitory computer-readable medium of claim 11, wherein the radio access technology processor is configured to process GSM signals.

14. The non-transitory computer-readable medium of claim 11, wherein the radio access technology processor is configured to process UMTS signals.

15. The non-transitory computer-readable medium of claim 11, wherein the radio access technology processor is configured to process LTE signals.

16. The non-transitory computer-readable medium of claim 11, wherein the radio access technology processor is configured to process signals associated with a first radio access technology and the instructions that cause configuring the radio access technology processor comprise instructions that cause configuring the radio access technology processor to process signals associated with a second radio access technology.

17. The non-transitory computer-readable medium of claim 16, wherein the first radio access technology is CDMA-based and the second radio access technology is GSM-based.

18. The non-transitory computer-readable medium of claim 16, wherein the first radio access technology is GSM-based and the second radio access technology is CDMA-based.

19. The non-transitory computer-readable medium of claim 16, wherein the first radio access technology is CDMA-based and the second radio access technology is LTE-based.

20. The non-transitory computer-readable medium of claim 11, wherein determining whether the conditions for receive-only mode for adjusting the clock of the mobile device are satisfied comprises determining that the mobile device is being operated by a user.

21. A system comprising:
one or more processors; and
a non-transitory computer-readable medium including one or more sequences of instructions which, when executed by the one or more processors, causes:
determining whether conditions for receive-only mode for adjusting a clock of a mobile device are satisfied, wherein the conditions include a first condition that a radio access technology processor of the mobile device is turned off and a second condition that the mobile device is anticipating a request for location services;

in response to determining that the conditions are satisfied, configuring the radio access technology processor to operate in the receive-only mode, wherein,
in a transmit/receive mode, the radio access technology processor is programmed to transmit and receive radio signals, and
in the receive-only mode, the radio access technology processor is programmed to receive radio signals and to disable transmission of radio signals;

receiving time information by the radio access technology processor operating in the receive-only mode;

adjusting the clock of the mobile device according to the time information; and determining a location of the mobile device based on the adjusted clock using a navigation signal processor; and providing the location of the mobile device as an input to the location services.

22. The system of claim 21, wherein the radio access technology processor is configured to process CDMA signals.

23. The system of claim 21, wherein the radio access technology processor is configured to process GSM signals.

24. The system of claim 21, wherein the radio access technology processor is configured to process UMTS signals.

25. The system of claim 21, wherein the radio access technology processor is configured to process LTE signals.

26. The system of claim 21, wherein the radio access technology processor is configured to process signals associated with a first radio access technology and the instructions that cause configuring the radio access technology processor comprise instructions that cause configuring the radio access technology processor to process signals associated with a second radio access technology.

27. The system of claim 26, wherein the first radio access technology is CDMA-based and the second radio access technology is GSM-based.

28. The system of claim 26, wherein the first radio access technology is GSM-based and the second radio access technology is CDMA-based.

29. The system of claim 26, wherein the first radio access technology is CDMA-based and the second radio access technology is LTE-based.

30. The system of claim 21, wherein determining whether the conditions for receive-only mode for adjusting the clock of the mobile device are satisfied comprises determining that the mobile device is being operated by a user.

* * * * *